O. TASHJIAN.
METHOD OF AND APPARATUS FOR CURING RAISINS AND OTHER FRUIT.
APPLICATION FILED AUG. 12, 1913.
1,140,009.
Patented May 18, 1915.
2 SHEETS—SHEET 1.
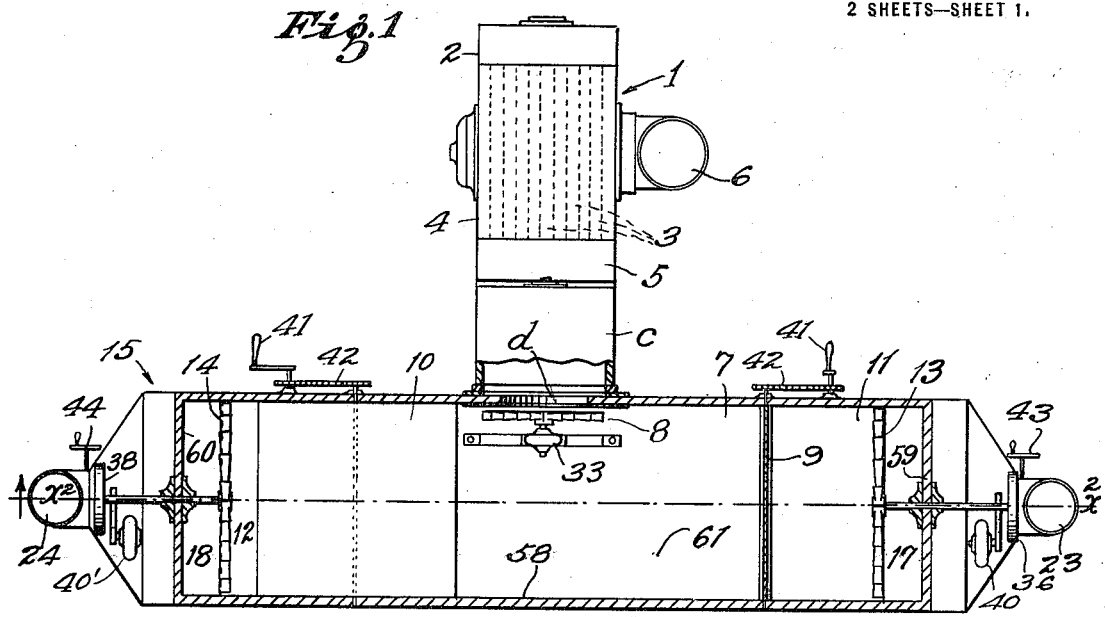
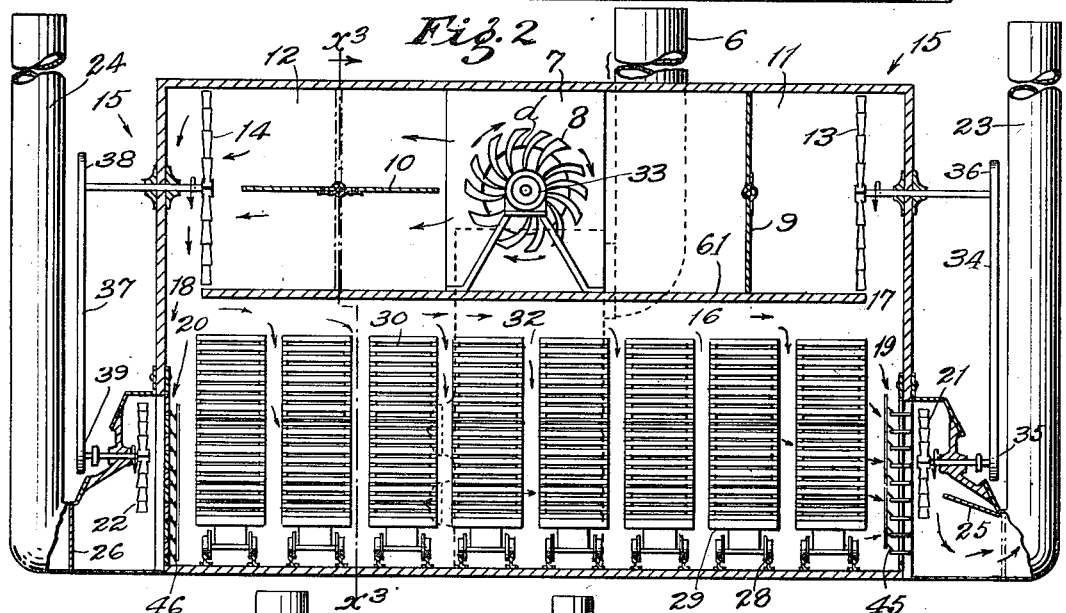
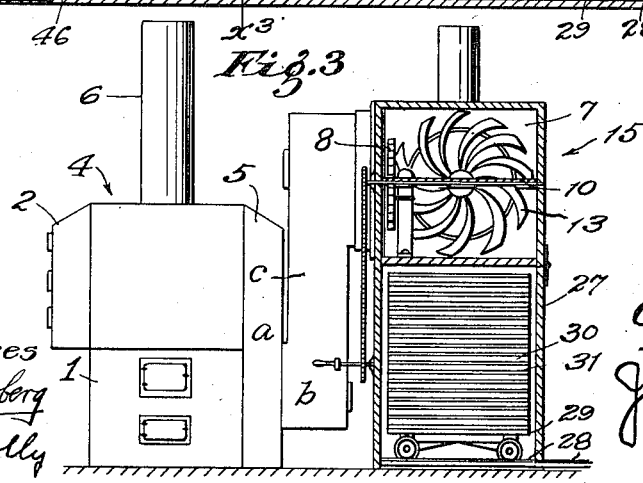
Witnesses
Thor Sjoberg
C. C. Holly
Inventor:
Ohanes Tashjian
by
James R. Townsend
his atty.

O. TASHJIAN.
METHOD OF AND APPARATUS FOR CURING RAISINS AND OTHER FRUIT.
APPLICATION FILED AUG. 12, 1913.
1,140,009.
Patented May 18, 1915.
2 SHEETS—SHEET 2.
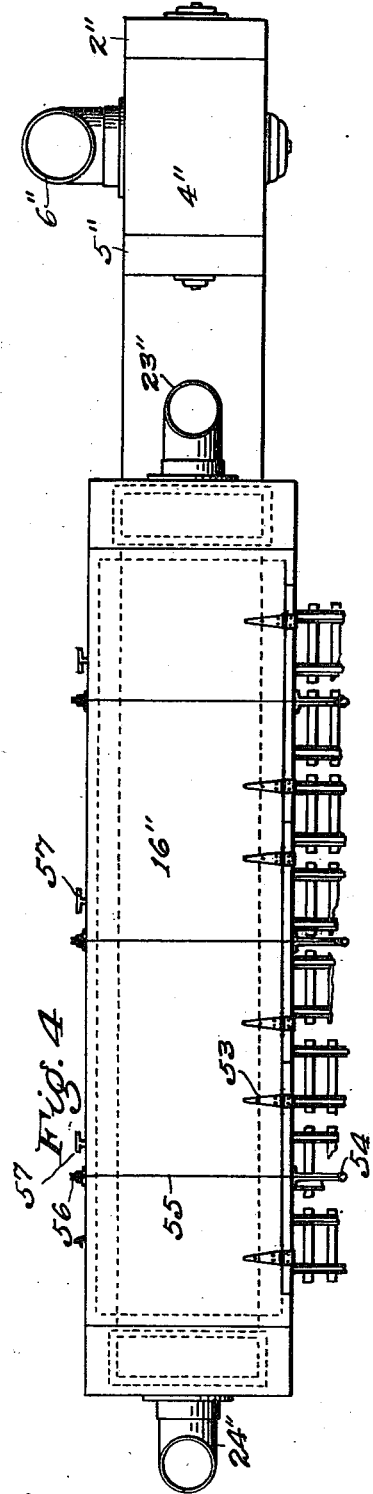
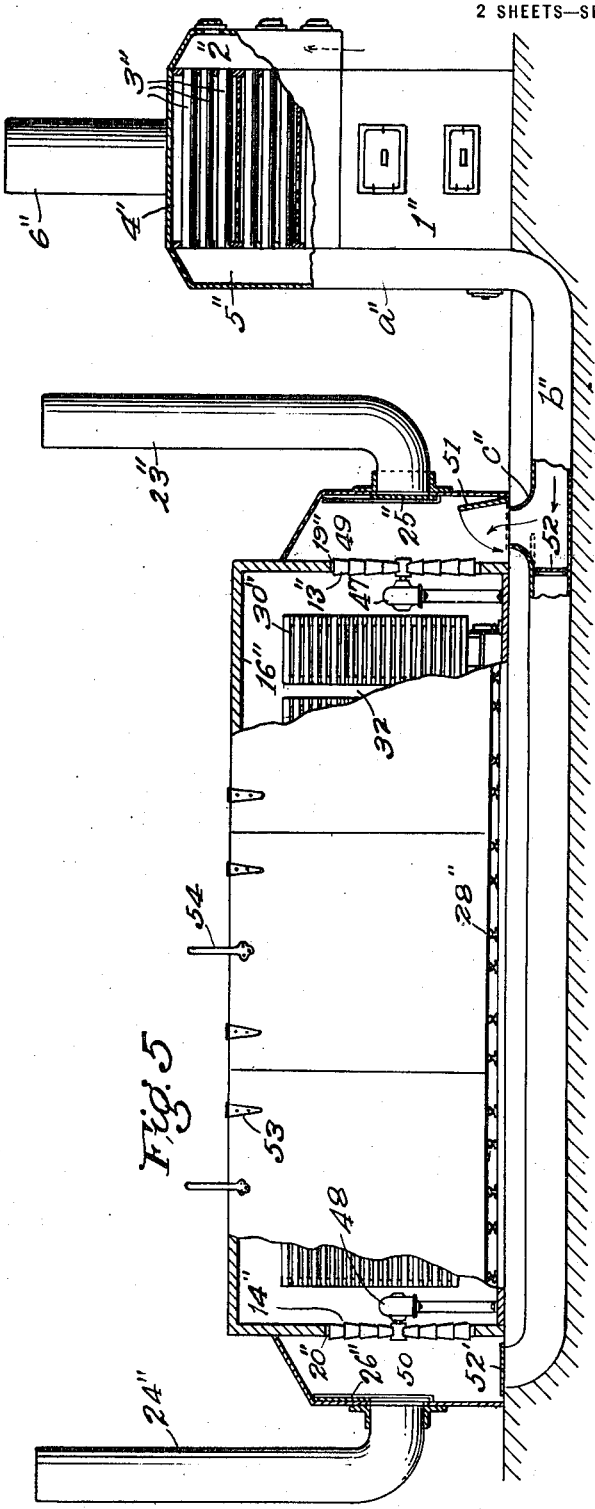
Witnesses
Thor Sjöberg
C. C. Holly
Inventor
Ohanes Tashjian
by James R. Townsend
his atty

UNITED STATES PATENT OFFICE.

OHANES TASHJIAN, OF FRESNO, CALIFORNIA.

METHOD OF AND APPARATUS FOR CURING RAISINS AND OTHER FRUIT.

1,140,009.   Specification of Letters Patent.   Patented May 18, 1915.

Application filed August 12, 1913. Serial No. 784,422.

*To all whom it may concern:*

Be it known that I, OHANES TASHJIAN, an Armenian subject of the Sultan of Turkey, formerly residing at Smyrna, in Armenia, now residing at Fresno, in the county of Fresno and State of California, have invented a new and useful Method of and Apparatus for Curing Raisins and other Fruit, of which the following is a specification.

An object of this invention is to cure raisins more rapidly than has heretofore been possible, at the same time preserving the delicate flavor of the fruit and producing a raisin of finer quality and clearer appearance than can be produced by former methods also preserving the natural color of the fruit to a very great extent and avoiding the necessity or desirability of bleaching.

It has heretofore been found very difficult to artificially cure raisins rapidly because of the liability of injuring the fruit by excessive heat, and an object of this invention is to avoid all such liability.

This invention comprises a new method of curing raisins which consists in subjecting the ripe grapes to the drying action of a large volume of hot air and applying positive means to move the air in contact with the fruit entirely aside from, and preferably in opposition to natural draft; said method in some instances consists in providing above the raisins a stratum of hot dry air and forcing such stratum downward over, around and past the fruit, thereby carrying the products of evaporation downward through the fruit and then carrying off such products and air at a lower level. Said invention also includes apparatus whereby this novel method is effected.

The invention may be applied in the curing of fruits such as figs, apricots, peaches, pears, apples, etc., as well as raisin grapes but is deemed more particularly valuable in its application to the raisin and fig industry on account of the delicacy of the operation of curing raisins and figs, and the superior character of the raisins I have produced thereby. By this invention I make it possible to properly cure raisins in a period of about nine hours, more or less, from the beginning of the operation upon the freshly picked grapes until the properly cured raisin is produced and the raisins are not browned or discolored but the transparency of the fruit is practically preserved.

The apparatus by which the invention may be carried out in whole or in part is capable of embodiment in various forms and I do not limit the embodiment to any specific form.

A further feature of the invention consists in moving dry, hot air alternately in opposite directions about the fruit by means of fans and in drawing the air from the fruit in like manner, the alternating periods being of such duration respectively, as may be found most advantageous under the various specific conditions that may occur from time to time.

The accompanying drawings illustrate the invention.

Figure 1 is a plan view of apparatus adapted for carrying out this invention; the housing and one draft door being in horizontal section on the plane of the upper fan axes. Fig. 2 is a broken elevation of such apparatus in section on line $x^2$, Fig. 1. Fig. 3 is a transverse section from line $x^3$, Figs. 1 and 2. Fig. 4 is a plan of a form of apparatus adapted for carrying out this invention in part. Fig. 5 is a broken elevation of the apparatus shown in Fig. 4, parts being in vertical mid-section.

A suitable form of air heater comprising a fire-box 1 having an air receiving flue 2 at one side, air heating tubes 3 leading from said air receiving flue 2 through the fire chamber 4 and discharging into a hot air trunk 5, there being a suitable draft appliance as a smoke stack 6 to carry off the products of combustion from the fire-box.

The hot air trunk 5 is constructed to cause a mixing and tempering of its contents as the hot air flows therethrough, and to this end is shown as being bent and comprising a descending limb $a$, a lowed bend $b$ and an ascending limb $c$, the latter opening through an orifice $d$ into a central fan chamber 7 in which is located a central upper fan 8 to further mix the air and drive it onward. On opposite sides of fan 8 in the fan chamber 7 are two draft controlling doors 9, 10 opening respectively into and forming, when closed, the ends of fan chambers 11 and 12 from which the air is driven by fans 13, 14 respectively. The three fan chambers 7, 11 and 12 constitute the top story of a two-story dry house 15, the lower story of which constitutes the raisin curing chamber 16 in which raisins or other kinds of fruit can be cured.

Hot air passages 17 and 18 are provided to receive air from the secondary upper fans 13, 14 and to force the air into the top of the curing chamber; said inlets being at the top of such chamber so that hot air enters the curing chamber 16 at the top. Said curing chamber is provided near its bottom with valved air outlets 19, 20, each provided with suitable draft means as the fans 21, 22 leading to the draft flues 23, 24. Said outlets are respectively controlled by suitable draft controlling means as the dampers 25, 26.

The curing chamber is provided with doors 27, and a number of tracks 28 on which the fruit trucks 29 run to carry the superposed raisin trays 30 that are suitably spaced apart to form air passages 31 to allow air to pass through between said trays to take up the moisture from the grapes thereon. Said trucks when loaded with fresh fruit may be rolled into the curing chamber 16 and the chamber closed in the usual way, and when the fruit is cured the trucks are run out and the trays of dried and cured fruit replaced with trays of fresh fruit.

In practical operation when the heater is fired and the fan 8 is operated and an outlet is provided from the chamber 7, by opening a draft door at one end and dampers at the other end of the apparatus, air will be heated in the tubes 3 and carried through the trunk 5, and after being thoroughly mixed and all stratification broken up it will enter the central top mixing and distributing chamber 7. In starting up the apparatus one of the draft doors, as the door 10 will be opened, and the other draft door 9 will be closed. The door or valve 25 at the end of the chamber 16 opposite the inlet 18 from fan 14 will be open and the fans 14 and 21 started in operation. In this way the hot air will be introduced at the top of the curing chamber 16 and there form a stratum which will extend downwardly as the operation of the apparatus continues until all of the cold air in the curing chamber 16 has been blown out and the operation will thus be continued until the chamber 16 is thoroughly charged with hot air which absorbs moisture and is carried off. This may be done either before or after the fresh raisin grapes or other fruit have been placed in the chamber 16 and will be continued with proper alternation of current from end to end of chamber until the fruit is cured.

It is evident that when the curing chamber 16 has been filled with trucks loaded with trays filled with raisin grapes or other fruit, and the charging doors 27 closed, the hot air reaching the grapes at the top of the stacks will thereby become more or less cooled and absorbing the moisture from the raisin grapes or other fruit will thus become heavier and will descend through the curing chamber 16 aided thereto by gravity as well as by the force of the fans, and that the tendency of the entire aerial contents of the curing chamber will be to move from the inlet 18 horizontally as it passes over the trays and downwardly in the inter-spaces 32 between the stacks of trays and downwardly at the sides of the trays and on to the outlet 19 from whence it is exhausted by the action of the exhaust fan 21 when the damper 25 is open.

The object of the exhaust fans is to produce more or less rarefaction within the curing chamber and to facilitate carrying off the products of evaporation without any liability of condensation in the chamber.

By this apparatus the air is thoroughly tempered and its pressure and dryness and heat within the curing chamber may be accurately determined by regulating the speed of the fans, which regulation may be originally determined at or before the time of installation.

When the apparatus has been in operation for a period of about nine hours, more or less, and it is found that the moisture has been sufficiently removed from the grapes and that properly cured raisins have been produced from the grapes, the trucks will be rolled out of the chamber and the trays replaced with trays of fresh fruit.

The fans 8, 13, 14, 21 and 22 may be driven by any suitable means and in the drawings the fan 8 is shown as driven by an independent electric motor 33; the fans 13 and 21 are connected by a belt 34 on pulleys 35, 36 and are driven by a common electric motor 40, while the fans 14 and 22 are connected by a belt 37 on pulleys 38, 39 and are driven by an electric motor 40' common to both.

The draft controlling doors 9, 10 are controlled by any suitable means as the cranks 41 and the sprocket wheel and chain connections 42, the cranks being located so that the same may be reached from the ground. The handles 43, 44 are provided to operate dampers 25, 26, and draft controlling shutters 45, 46 are provided for the openings 19, 20 so that the draft through the curing chamber can be regulated as desired.

It is understood that any suitable means may be provided for controlling and directing the draft through the apparatus, but it is important that provision be made whereby a large volume of air can be passed through the curing chamber 16 alternating in opposite directions, the object throughout the entire process being to apply hot, dry air in as uniform a manner as possible to all of the fruit under treatment, and alternating the blast or current of air by driving it first in one direction along and across such stacks of trays and then driving it in the other direction along and across such stacks of trays. The moisture is removed from the fruit rapidly but without discoloring effect upon the fruit and all of the fruit contents of chamber 16 may be cured throughout to practically the same extent and in the same manner, thus making the product from the same kind of grapes practically uniform throughout.

In practical operation, with the apparatus as shown in Figs. 1, 2 and 3, the fan 8 will be operated constantly throughout the entire process of curing the fruit in the chamber 16 but the draft doors 9 and 10 will be alternately opened and closed, and the draft damper 25 will be opened and the damper 26 closed when the draft door 10 is opened and vice versa, when the draft door 9 is opened.

The fans 14 and 21 will be operated and the fans 13 and 22 held stationary while the door 10 and damper 25 are open and door 9 and damper 26 are closed; and fans 13 and 22 are operated and fans 14, 21 are held still while door 9 and damper 26 are open.

In Figs. 4 and 5 there is shown a modified form of apparatus designed to make provision for alternating the current or draft horizontally through the curing chamber 16″ without bringing the air down from above. In these views the parts corresponding to parts shown in Figs. 1, 2 and 3 are generally indicated by the same numeral with the addition of an index (″).

The fans 13″, 14″ are driven by motors 47 and 48, and the hot air is conducted from the heater alternately to air chambers 49, 50 which communicate respectively through the draft openings 19″, 20″ to the interior of the chamber 16″; and dampers 51, 52, 52′ are provided to cut off the flow of hot air from the hot air trunk b″.

When this apparatus is filled with stacks of trays of fruit the exhaust dampers 25″, 26″ will be opened and closed respectively at one and the other end of the apparatus, and the hot air damper 51 at one end will be opened when the hot air damper 52′ at the other end of the apparatus is closed and the exhaust damper 26″ at such end of the apparatus is open; and the damper 51 will be set to admit and the fan 13″ will be operated to force air into the chamber 16″ while the damper 25″ is closed and damper 26″ open, while the fan 14″ will be operated to force air out of said chamber 16″ through flue 24″, and when the dampers are in a reverse position the fans will be reversely operated, thus causing the air to flow in the reverse direction. This method and apparatus are also applicable for restoring and curing old raisins which have been washed for the purpose of cleaning them of sugar and from accumulations of foreign matter which may have occurred in careless field drying, or otherwise, in which case the raisins may first be washed in water and then placed on the trays and treated as above described, the character of the treatment being such that the re-cured raisins are much improved in quality from their former state.

The charging doors 27, may be mounted and operated in any practical way and for convenience of illustration are shown as hinged to the housing by hinges 53 at the tops of the doors, there being arms 54 fixed to and extending upwardly and forwardly aslant from the doors respectively; there being lines 55 fastened thereto and passed over pulleys 56 so that by drawing upon the lines the doors may be opened and by fastening the lines to the cleats 57 they may be held open for running the trucks into and out of the housing.

It is to be understood that the construction of the dampers and doors and the means for handling them may be readily varied without departing from the spirit of the invention.

It is to be noted that the upper fans 13 and 14 are set at a right angle to the fan 8 and that each of the fans is adapted to drive the air directly against an obstruction as the front wall 58 or one of the end walls 59, 60, thus causing internal mixing currents and pressures, and that the air from each fan is turned at right angles by such obstructions so that by the time the air passes the end of the upper floor 61 it has been freed from all stratification and is of uniform temperature throughout. These abrupt direction breakers are not present in the form shown in Figs. 4, 5 but the fans are driven by separate motors 47, 48 so that air currents may alternate in direction at the pleasure of the operator.

It is particularly noted that the stacks of trays 30 are not separated from one another by partitions but that the dehydrating air can flow laterally from stack to stack of the trays as it passes from end to end of the curing chamber 16. This is valuable because I have discovered that lateral as well as downward movement of the dehydrating air is important to prevent too rapid absorption of moisture from the fruit, it being clear that the fruit nearer one end of the curing chamber will be subjected to the comparatively slight absorptive action of air which has already taken up some moisture from the fruit nearer the other end of said chamber and that first the fruit nearer one end of said chamber and then nearer the other end of said chamber is subjected to the slower evaporative action, according to the direction of the draft.

I claim:

1. The method set forth of curing fruit which consists in subjecting the fruit in stacks of superposed trays in a chamber to hot dry air; supplying the air to the top of the chamber and causing it to flow laterally from stack to stack and to descend and travel along the trays from top to bottom, and alternating the current from end to end of the chamber.

2. The method set forth of curing raisins and other fruit which consists in subjecting stacks of the fruit on superposed trays in a curing chamber to hot, dry air; supplying the air to the top of the chamber and causing it to flow laterally from stack to stack and to descend and travel along the trays from top to bottom, and producing a tendency to rarefaction at the lower part of the curing chamber.

3. The method set forth of curing raisins which consists in subjecting stacks of raisins on superposed trays in a curing chamber to hot, dry air; supplying such air to the top of the chamber and causing it to flow laterally from stack to stack and to descend and travel along the trays from top to bottom; producing a tendency to rarefaction at the lower part of the curing chamber; and alternating the flow from end to end of the chamber, substantially as and for the purpose set forth.

4. The fruit curing apparatus set forth comprising an air heater, a hot air tempering trunk connected with the heater, a mixing chamber, a fan to draw air from the tempering trunk and to force it into the mixing chamber, a curing chamber below the mixing chamber, means to deliver air from the mixing chamber to the curing chamber, means to support fruit in the curing chamber, and means at the lower portion of the curing chamber to exhaust air therefrom.

5. The fruit curing apparatus set forth comprising an air heater, a tempering trunk connected with the heater, a mixing chamber, a fan to draw air from the tempering trunk and to force it into the mixing chamber, a curing chamber below the mixing chamber, means to deliver air from the mixing chamber alternatively to first one end and then the opposite end of the curing chamber, means to support fruit in intercommunicating stacks in the curing chamber, means at the lower portion of the curing chamber to exhaust air therefrom, and means to cause the air to pass first in one then in the other direction through said curing chamber.

In testimony whereof, I have hereunto set my hand at Fresno California, this 4th day of August 1913.

OHANES TASHJIAN.

In presence of—
  A. OHANNESIAN,
  E. D. KERNER.